US007618694B2

(12) United States Patent
Nishizawa et al.

(10) Patent No.: US 7,618,694 B2
(45) Date of Patent: Nov. 17, 2009

(54) BIODEGRADABLE LABEL FOR IN-MOLD FORMING AND BIODEGRADABLE CONTAINER HAVING THE LABEL ATTACHED THERETO

(75) Inventors: Takatoshi Nishizawa, Ibaraki (JP); Atsushi Kasai, Chiyoda-ku (JP); Rie Shirahama, Yokohama (JP)

(73) Assignee: Yupo Corporation, Tokyo (JP)

( * ) Notice: Subject to any disclaimer, the term of this patent is extended or adjusted under 35 U.S.C. 154(b) by 103 days.

(21) Appl. No.: 11/446,183

(22) Filed: Jun. 5, 2006

(65) Prior Publication Data

US 2006/0222799 A1 Oct. 5, 2006

Related U.S. Application Data

(60) Division of application No. 10/983,666, filed on Nov. 9, 2004, now abandoned, which is a continuation of application No. PCT/JP03/05784, filed on May 8, 2003.

(30) Foreign Application Priority Data

Sep. 5, 2002 (JP) ............................ 2002-133896

(51) Int. Cl.
*B29D 22/00* (2006.01)
*B29D 23/00* (2006.01)
*B32B 1/08* (2006.01)

(52) U.S. Cl. .................. 428/35.7; 428/411.1; 428/480; 428/524; 428/910; 428/323

(58) Field of Classification Search ................ 428/35.7, 428/411.1, 480, 524, 910, 323
See application file for complete search history.

(56) References Cited

U.S. PATENT DOCUMENTS

| | | | | |
|---|---|---|---|---|
| 5,444,113 | A * | 8/1995 | Sinclair et al. | 524/306 |
| 5,853,876 | A * | 12/1998 | Takano et al. | 428/352 |
| 2002/0098341 | A1 | 7/2002 | Schiffer et al. | |

FOREIGN PATENT DOCUMENTS

| | | | |
|---|---|---|---|
| EP | 1 086 809 | A2 | 3/2001 |
| EP | 1 227 129 | A1 | 7/2002 |
| EP | 1 491 585 | A1 | 12/2004 |
| JP | 5-8289 | | 1/1993 |
| JP | 8-323946 | A | 12/1996 |
| JP | 9-291165 | A | 11/1997 |
| JP | 10-16165 | | 1/1998 |
| JP | 10-202690 | | 8/1998 |
| JP | 2000-281818 | | 10/2000 |
| JP | 2001-171059 | A | 6/2001 |
| JP | 2003-181919 | A | 7/2003 |

* cited by examiner

*Primary Examiner*—Michael C Miggins
(74) *Attorney, Agent, or Firm*—Oblon, Spivak, McClelland, Maier & Neustadt, L.L.P.

(57) ABSTRACT

The object of the present invention is to provide a biodegradable label for in-mold forming, which is excellent in water resistance, is printable to allow for printing letters, or the like, by various printing methods, and is biodegradable in a natural environment; and to provide a biodegradable container attached with this biodegradable label for in-mold forming.

In the present invention, the gist of the first invention is a biodegradable label for in-mold forming, comprising a laminate film (a/b), having a film (a), comprising a biodegradable resin (A), and a film (b), comprising a heat-sealable biodegradable resin (B); and the gist of the second invention is a biodegradable container attached with this biodegradable label for in-mold forming.

8 Claims, No Drawings

BIODEGRADABLE LABEL FOR IN-MOLD FORMING AND BIODEGRADABLE CONTAINER HAVING THE LABEL ATTACHED THERETO

This is a divisional application of U.S. application Ser. No. 10/983,666, filed Nov. 9, 2004, which is a continuation of PCT/JP03/05784 filed on May 8, 2003.

TECHNICAL FIELD

The present invention relates to a biodegradable label for in-mold forming and a biodegradable container attached with the label. More specifically, the present invention relates to a label for attachment to a surface of a biodegradable container, produced from a biodegradable resin by injection molding, injection blow molding, blow molding, vacuum molding, air-pressure molding or the like, and also relates to a biodegradable container attached with the label.

BACKGROUND ART

In recent years, waste disposal of used synthetic resin molded articles (products) by land-fill or incineration sometimes causes a problem of environmental pollution. As a measure for solving this environmental pollution problem, use of biodegradable resins is attracting attention. Studies are also being made on the use of these biodegradable resins as the raw material resin for production of various packaging containers. For example, a container, biodegradable in a natural environment, and excellent in transparency and impact strength, has been proposed; such as a biodegradable container formed of a composition mainly comprising a copolymer of a polylactic acid or lactic acid and another hydroxycarboxylic acid (see, JP-A-6-23828 (the term "JP-A," as used herein, means an "unexamined published Japanese patent application"), and a biodegradable container formed of a composition mainly comprising an aliphatic polyhydric alcohol and an aliphatic polybasic acid (see, JP-A-7-172425).

The label which is attached to a surface of the packaging container is also required to be made of a material, biodegradable in a natural environment, and use less generating heat of combustion when burned for disposal. In order to satisfy this requirement, there have been proposed, for example, a container comprising a biodegradable resin, where the container's outer peripheral surface is wound around by a shrinkable label made of the same biodegradable resin (see, JP-A-8-58797), and a method of molding a container by using a biodegradable polyester, where the container is molded by previously inserting a paper-made label in the mold (see, JP-A-8-58796 and JP-A-10-291247).

The paper label is biodegradable and generates less heat of combustion, but it is disadvantageously weakened by water, and is liable to be damaged during use. As a measure for improving the defects of paper label, a synthetic paper for label, for example, comprising polypropylene and polyethylene has been proposed (see, JP-A-2-84319), but this label is not biodegradable, and therefore, the problem of environmental pollution still remains. A label for in-mold forming, comprising a biodegradable resin-made film, and a biodegradable container attached with the label have heretofore not been proposed.

As a result of intensive investigations to provide a biodegradable label for in-mold forming, which is excellent in water resistance, printable to allow for printing letters, or the like, by various printing methods, and degradable in a natural environment, and also to provide a biodegradable container attached with the label, the present invention has been accomplished.

DISCLOSURE OF THE INVENTION

In order to solve the above-described problems, a first invention provides a biodegradable label for in-mold forming, comprising a laminate film (a/b), having a film (a), comprising a biodegradable resin (A), and a film (b), comprising a heat-sealable biodegradable resin (B).

A second invention provides a biodegradable container, obtained by attaching a label for in-mold forming to a surface of a container, comprising a biodegradable resin (C), and the label for in-mold forming comprising a laminate film (a/b), having a film (a) comprising a biodegradable resin (A), and a film (b) comprising a heat-sealable biodegradable resin (B).

BEST MODE FOR CARRYING OUT THE INVENTION

The present invention is described in detail below.

The "in-mold forming," as used in the present invention, means a molding method of, injection molding, injection blow molding, blow molding, vacuum molding, air-pressure molding, or the like, for producing various containers, disposing a label directly on the mold cavity surface or mold surface, and attaching this label to a part of the wall surface of a product container.

The biodegradable label for in-mold forming, according to the first invention of the present invention, comprises a laminate film (a/b), having a film (a) comprising a biodegradable resin (A) {hereinafter sometimes simply referred to as a film (a) or as (a)}, and a film (b) comprising a heat-sealable biodegradable resin (B) {hereinafter sometimes simply referred to as a heat-sealable film (b) or as (b)}. The biodegradable resin (A) and biodegradable resin (B), as used in the present invention, each means a thermoplastic resin degradable in a natural environment.

The biodegradable resin is not particularly limited, as long as it is a thermoplastic resin, degradable in a natural environment. Examples thereof include (1) aliphatic oxycarboxylic acid (co)polymers, which are a polycondensate or copolycondensate of an aliphatic oxycarboxylic acid; (2) lactone (co) polymers which are an open-ring polymer or copolymer of lactone, particularly, caprolactone (co)polymers (e.g., polycaprolactone, caprolactone copolymer); and (3) polyester resins, which are a polycondensate or copolycondensate of an aliphatic or alicyclic diol, with an aliphatic or alicyclic dicarboxylic acid, or a copolycondensate of such diol and dicarboxylic acid with lactone and hydroxycarboxylic acid. In order to improve various properties of the biodegradable resin, a chain extending agent, such as isocyanate, or a trifunctional or greater polyfunctional compound, can be contained.

Examples of the aliphatic oxycarboxylic acid include glycolic acid, lactic acid, 2-hydroxy-n-butyricacid, 2-hydroxy-3-methyl-n-butyric acid, 2-hydroxy-3,3-dimethyl-n-butyric acid, 3-hydroxy-n-butyric acid, 4-hydroxy-n-butyric acid, 2-hydroxy-n-valeric acid, 3-hydroxy-n-valeric acid, 4-hydroxy-n-valeric acid, 5-hydroxy-n-valeric acid, 2-hydroxy-n-hexanoic acid, 2-hydroxy-1-hexanoic acid, 3-hydroxy-n-hexanoic acid and 4-hydroxy-n-hexanoic acid. Examples of the lactone include propiolactone, butyrolactone, valerolactone, caprolactone and laurolactone.

Examples of the aliphatic or alicyclic diol include ethylene glycol, 1,3-propanediol, 1,4-butanediol, 1,5-pentanediol, 1,6-hexanediol, 1,8-octanediol, 1,10-decanediol, 1,2-cyclohexanediol, 1,4-cyclohexanediol, 1,2-cyclohexanedimethanol and 1,4-cyclohexanedimethanol. Examples of the aliphatic or alicyclic dicarboxylic acid include oxalic acid, malonic acid, succinic acid, glutaric acid, adipic acid, pimelic acid, suberic acid, azelaic acid, sebacic acid, undecadicarboxylic acid, dodecadicarboxylic acid, hexahydrophthalic acid, hexahydroisophthalic acid and hexahydroterephthalic acid. In the production of the polyester, a derivative of these dicarboxylic acids, such as an alkyl ester having approximately from 1 to 4 carbon atoms or anhydride, can also be used.

In the aliphatic or alicyclic polyester resin, an aromatic diol, an aromatic dicarboxylic acid or an aromatic oxycarboxylic acid may be contained as a copolymerization component within the range that does not impair the biodegradability. Examples of the aromatic diol include 2,2-bis(4'-hydroxphenyl)propane, examples of the aromatic dicarboxylic acid include terephthalic acid, isophthalic acid and naphthalenedicarboxylic acid, and examples of the aromatic oxycarboxylic acid include hydroxybenzoic acid.

The production process of such an aliphatic or alicyclic polyester resin is not particularly limited, but examples thereof include a process through open-ring polymerization from a cyclic monomer, a melt polycondensation process described in JP-A-8-239461, and a process of performing dehydration polycondensation in an organic solvent.

The biodegradable resin (A) preferably comprises at least one member of aliphatic polyesters and polylactic acids, each containing from 0.02 to 30 mol % of an aliphatic oxycarboxylic acid unit represented by the following formula [I], from 35 to 49.99 mol % of an aliphatic diol unit represented by the following formula [II], and from 35 to 49.99 mol % of an aliphatic dicarboxylic acid unit represented by the following formula [III]:

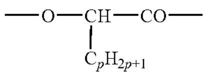

[I]

(wherein p is 0 or an integer of 1 to 10);

$$—O—(CH_2)_m—O— \quad [II]$$

(wherein m is an integer of 2 to 10); and $$—OC—(CH_2)_n—CO— \quad [III]$$

(wherein n is 0 or an integer of 1 to 12).

Among these aliphatic polyesters and polylactic acids, preferred are those where formula [I] is a glycolic acid unit and/or a lactic acid unit, formula [II] is an ethylene glycol unit and/or a 1,4-butanediol unit, and formula [III] is a succinic acid unit and/or an adipic acid unit.

The molecular weight of the biodegradable resin (A) is preferably from 5,000 to 500,000, in terms of the number average molecular weight. If the number average molecular weight is less than 5,000, the mechanical strength as a label is insufficient, whereas if it exceeds 500,000, the molding becomes difficult. Thus, either is not preferred. The number average molecular weight, as used herein, means a value measured by GPC method and converted to polystyrene.

The melting point of the biodegradable resin (A) is preferably from 80 to 200° C., more preferably from 90 to 180° C., and still more preferably from 100 to 130° C.

In producing the film (a), this biodegradable resin (A) may be only one biodegradable resin (A), a mixture of two or more biodegradable resins (A), or a mixture of a biodegradable resin and a non-biodegradable resin (D). In the case of a mixture of a biodegradable resin (A) and a non-biodegradable resin (D), the biodegradable resin (A) preferably accounts for 50 wt % or more, because if the percentage thereof is small, the label is poorly biodegradable. In preparing a mixture of biodegradable resins (A) or a mixture of a biodegradable resin (A) and a non-biodegradable resin (D), when the compatibility between resins is low, a compatibilizing agent may be blended. If desired, additives, such as inorganic fine powder (E1) and/or organic filler (E2), plasticizer, softening agent, lubricant, antioxidant, ultraviolet absorbent and light stabilizer, may be further blended.

Examples of the inorganic fine powder (E1) include calcium carbonate, calcined clay, silica, diatomaceous earth, China clay, talc, titanium oxide, barium sulfate, alumina, zeolite, mica, sericite, bentonite, sepiolite, vermiculite, dolomite, wallastonite and glass fiber. The inorganic fine powder (E1) preferably has a particle size of 0.01 to 15 μm, and more preferably from 0.1 to 5 μm.

The organic filler (E2) preferably comprises a resin of which melting point or glass transition temperature is higher than the melting point of the biodegradable resin (A), and which is a different kind of resin from the main component biodegradable resin (A). Specific examples thereof include polyethylene terephthalate, polybutylene terephthalate, polycarbonate, polyamide 6 and polyamide-nylon 6.6.

The opacity of the film (a) can be adjusted by combining the blending amount of inorganic fine powder (E1) and/or organic filler (E2) and the stretching magnification at the shaping of film. When stretched, the inorganic fine powder (E1) and/or organic filler (E2) can trigger the formation of fine cavities on the film (a) surface and fine voids in the film (a). The fine cavities on the film (a) surface can favor the enhancement of writability or printing aptitude (for example, ink adhesion and ink transferability), and the fine voids in the film (a) can favor lightweighting of the film obtained. The opacity of the film (a) can enhance the visible appearance of the biodegradable container by combining the color hue with, for example, letters (including trade name of the product housed in the container, use method of the product, barcode, manufacturer, sales company name, and the like), character or pattern (hereinafter these are collectively called "letters or the like") printed on the film.

As for the opacity of the film (a), for example, when the inorganic fine powder (E1) and/or organic filler (E2) are blended in an amount of less than 10 wt %, a highly transparent film (a) having an opacity of less than 20% can be obtained, and when the inorganic fine powder (E1) and/or organic filler (E2) are blended in an amount of 10 to 30 wt %, a translucent film (a) having an opacity of 20 to 50% can be obtained. Furthermore, when the content of the inorganic fine powder (E1) and/or organic filler (E2) is 30 wt % or more, a highly opaque film (a) having an opacity of 50% or more can be obtained. Also, by stretching the film, having blended therein the inorganic fine powder (E1) and/or organic filler (E2), a film (a) having a higher opacity can be obtained.

The film (a) can be produced by using, as the raw material resin component, only a biodegradable resin (A) or a mixture of a biodegradable resin (A) and a non-biodegradable resin (D), according to a conventionally known method for shaping a thermoplastic resin into a film. Examples of the conventionally known film-shaping method include an extrusion molding method and a calender molding method. Examples of the extrusion molding method include an inflation method of fixing a circular die to the end of an extruder and inflating the extruded tube by blowing air into the tube, and a method of fixing a T-die or I-die to the end of an extruder and shaping a film. The film from the T-die or I-die may be an unstretched film, a uniaxially stretched film, stretched in one axial direction, or a biaxially stretched film, stretched in two axial directions. A roll stretching system is preferred for uniaxially stretching the film, and a tenter system is preferred for biaxially stretching the film.

The stretching magnification is not particularly limited, and is determined by taking into account the end use of the film (a) of the present invention and the properties of the resin used. The stretching magnification is usually from 1.2 to 11 times, preferably from 1.5 to 10 times, more preferably from 2 to 7 times.

In the case of clip stretching using a tenter oven, the stretching magnification is preferably from 2 to 11 times.

The area magnification is from 1.5 to 80 times, preferably from 2 to 60 times, more preferably from 2 to 50 times.

The film (a) may be either a single-layer film or a laminate film obtained by stacking two or more layers. The laminate film may be produced by any method, such as (1) a method of melting multiple raw material resins in multiple extruders and stacking multiple layers in a co-extrusion die, (2) a method of previously shaping one raw material resin into a film, extruding another resin melted in another extruder from an extruder die to shape a film, and stacking this other film, still in the melted state, on the previously shaped film, or (3) a method of re-heating and stacking multiple films each previously shaped.

Examples of the combination in the laminate film include unstretched film (hereinafter simply referred to as "unstretched")/unstretched, unstretched/uniaxially stretched film (hereinafter simply referred to as "uniaxially stretched"), unstretched/biaxially stretched film (hereinafter simply referred to as "biaxially stretched"), uniaxially stretched/uniaxially stretched, uniaxially stretched/biaxially stretched, and biaxially stretched/biaxially stretched. In the case of producing a laminate film of three or more layers, this can be attained by a method of combining a single-layer film with the above-described two-layer film, or a method of combining those two-layer films with each other. The laminate film is preferably a laminate film containing a uniaxially stretched film. Incidentally, "/" in the combinations above means the interface between layers of the laminate film. The thickness of the film (a) can be selected in the range from 20 μm to 1.0 mm, preferably from 35 μm to 0.5 mm.

On at least one surface of the film (a), a heat-sealable film (b) is provided. The biodegradable resin (B) may be the same resin as the biodegradable resin (A), or may be a different resin. The melting point of the biodegradable resin (B) is preferably from 60 to 180° C., more preferably from 70 to 160° C., and still more preferably from 80 to 120° C. In particular, the melting point of the biodegradable resin (B) is preferably 5° C., or more, lower than the melting point of the biodegradable resin (A). In the case where the biodegradable resins (A) and (B), each is a mixture of two or more biodegradable resins, the melting point of the biodegradable resin contained in the largest amount in the biodegradable resin (B), is preferably 5° C., or more, lower than the melting point of the biodegradable resin contained in the largest amount in the biodegradable resin (A). When the melting point of the biodegradable resin (B) is 5° C., or more, lower than that of the biodegradable resin (A), the film (a), constituting the laminate film (a/b), is not softened, but only the heat-sealable film (b), is softened, at the production of a container comprising a biodegradable resin (C), and the laminate film (a/b) is heat-bonded (heat-sealed) to the surface of the container comprising a biodegradable resin (C). This is preferred because the printing surface, such as letters printed on the film (a) surface, is prevented from discoloration. When the biodegradable resin (B) has the same composition as the biodegradable resin (A), the melting point can be lowered by decreasing the molecular weight of the biodegradable resin (B), or blending a plasticizer or softening agent in the biodegradable resin (B).

The heat-sealable film (b) can be provided on at least one surface of the film (a), according to the method (1), (2) or (3), described above, in regard to the production of the multilayer film (a). For the purpose of enhancing adhesion between the film (a) surface and the heat-sealable film (b), a corona discharge treatment, a flame treatment, a plasma treatment, or the like, may be applied. Also, for the purpose of preventing air from being entrained in the interface between the film (a) and the heat-sealable film (b), the heat-sealable film (b) may be finely embossed. The thickness of the heat-sealable film (b) can be selected in the range from 5 to 200 μm.

The film (a) surface, on which letters, or the like, are printed, may be subjected to, if desired, a corona discharge treatment, a flame treatment or a plasma treatment for the purpose of enhancing printability. The method of printing letters, or the like, on the film (a) surface is not particularly limited, and, for example, a gravure printing method, an offset printing method, a flexo printing method or a screen printing method may be used. At this time, the printing ink used, including its vehicle, preferably has excellent heat resistance to an extent of not undergoing deterioration at the temperature for heat-bonding the biodegradable resin (C) and the heat-sealable film (b). The printing surface may extend throughout the label or may be a part of the label.

The in-mold label, where letters, or the like, are printed on the surface side and the back surface is finely embossed, is punched into a necessary shape or dimension. This in-mold label may be sized to allow for attachment to a portion of the wall surface (side wall and bottom wall) of the container, comprising a biodegradable resin (C), or to the entire side wall. Depending on the size, shape, or the like, of the wall surface of the biodegradable container, one container may be attached with one sheet of the in-mold label or with two or more multiple sheets of the in-mold label.

The biodegradable container, according to the second invention of the present invention, is characterized in that the container surface is attached with the in-mold label at the production of the container, by inserting or disposing the in-mold label to an appropriate portion of a mold. Examples of the production method for the product container include an injection molding method, an injection blow molding method, a blow molding method, a vacuum molding method and an air-pressure molding method. In the injection molding method, injection blow molding method and blow molding method, the label is inserted to the mold cavity surface, and fixed by applying static electricity or a vacuum. Thereafter, in the injection molding method, a melted, biodegradable resin (C) is ejected to the mold cavity, whereby a container having a wall surface heat-bonded with the in-mold label can be produced.

In the injection blow molding method and blow molding method, a parison is extruded to the mold cavity, and inflated by blowing compressed air into the parison to heat-bond the label to the wall surface of the inflated container, whereby a hollow container can be produced. In the vacuum molding method and air-pressure molding method, the label is disposed on the mold surface, and a vacuum or compressed air is applied to a heat-softened sheet made of a biodegradable resin (C), and whereby a container following the shape of the mold can be produced. At this time, the label is heat-bonded to the wall surface of the heat-softened sheet container made of a biodegradable resin (C).

The biodegradable resin (C), used in producing the biodegradable container, is not particularly limited, as long as it is a thermoplastic resin, biodegradable in a natural environment, and this resin may be the same as the biodegradable resin (A), or may be a different resin. The biodegradable resin (C) may be used alone, or may be used as a mixture of the biodegradable resin (C) and a non-biodegradable resin (D). In the case of a mixture of the biodegradable resin and a non-biodegradable resin (D), the biodegradable resin (C) preferably accounts for 50 wt % or more, because if the percentage thereof is small, the container is poorly biodegradable.

The biodegradable container, according to the second invention of the present invention, is not particularly limited in the shape, size, and the like, as long as it can be produced by an injection molding method, an injection blow molding method, a blow molding method, a vacuum molding method, an air-pressure molding method, or the like. Examples of the shape include a pail or barrel form, a cup form and a bottle form. The size may be any size from a large size, having a housing capacity exceeding 100 liter, to a small size of several milliliters (ml). The use of the biodegradable container is not particularly limited, and examples thereof include, but are not limited to, a container for chemicals, such as coating material, agricultural chemical, medicament and detergent; a container for food, such as edible oil and seasoning; a container for fragrant cosmetics, such as cosmetic, shampoo and rinse; a beverage container; and a fuel oil container.

EXAMPLES

The present invention is described in greater detail below by referring to the following Examples, but the present invention is not limited to these Examples, as long as its gist is observed.

In the Examples, the characteristic values of the raw material resin used, film, product container, and the like, were measured by the following methods.

(1) Composition of Biodegradable Resin:

Calculated from the area ratio in the spectrum obtained by 1H-NMR method.

(2) Molecular Weight:

Measured by GPC method (in terms of polystyrene).

(3) Melting Point:

Measured by DSC method (in a nitrogen stream at a temperature-rising rate of 16° C./min).

(4) Opacity:

Measured according to JIS P-8138.

(5) Soil Burial Test:

In a test farm at the Center for Analytical Chemistry and Science of Mitsubishi Chemical Corp., at Aoba-ku, Yokohama-shi, Kanagawa, the container was buried in a soil, constituted by kuroboku soil, for 6 months, from April, 2001, to September, 2001, by laying the label surface upside, with the depth from the soil surface to the label surface being 10 cm. After the passing of a test period, the container was taken out, and the outer appearance of the biodegradable container was observed visually.

Example 1

<Preparation of Film (a)>

An aliphatic polyester resin (A1) (80 wt %) (melting point: 110° C.), comprising 47.8 mol % of a constituent unit originated in 1,4-butanediol, 47.8 mol % of a constituent unit originated in succinic acid and 4.4 mol % of a constituent unit originated in lactic acid, and having a number average molecular weight of 69,000, and 20 wt % of a polylactic acid resin (A2) (melting point: 173° C.), having a number average molecular weight of 80,000, were mixed by a blender, and the obtained mixture was kneaded in an extruder (Model: MK-40, manufactured by Misuzuerie Co., Ltd.) set at a cylinder temperature of 180° C., then extruded into a sheet form, from a T-die fixed to the end of the extruder, and cooled by a cooling roll to obtain a film (a) having a thickness of 100 μm.

<Preparation of Heat-Sealable Biodegradable Resin (B)-Made Film (b) and Laminate Film (a/b)>

An aliphatic polyester resin (B) (melting point: 95° C.), comprising 48.6 mol % of a constituent unit originated in 1,4-butanediol, 41.0 mol % of a constituent unit originated in succinic acid, 7.6 mol % of a constituent unit originated in adipic acid and 2.8 mol % of a constituent unit originated in lactic acid, and having a number average molecular weight of 51,000, was melt-kneaded in an extruder (Model: MK-40, manufactured by Misuzuerie Co., Ltd.) set at a cylinder temperature of 140° C., then extruded into a sheet form, from a T-die fixed to the end of the extruder, and superposed on the back side of the film (a), and passed through a pair of embossing rolls comprising a metal roll and a rubber roll to form fine dotted embosses having a trough depth of 5 μm on the surface of the heat-sealable film (b1). The width of the obtained two-layer laminate film was 600 mm, the thickness of the film (a)/heat-sealable film (b) was 90 μm/10 μm, and the opacity of the film was 18%.

<Preparation of Biodegradable Label for In-Mold Forming>

The surface side of the film (a) of the laminate film obtained above, was treated by a corona discharge treating machine (Model: AGI-20, manufactured by Kasuga Denki, Inc.), and on the film (a) surface, letters, or the like, were printed with a UV offset ink (Bestcure 161S, trade name, produced by T&K Toka Company) in an offset press (Model: Diaya-II Type, manufactured by Mitsubishi Heavy Industries, Ltd.). Subsequently, the laminate film was punched, to obtain a biodegradable label for in-mold forming, in a width of 70 mm and a length of 90 mm.

<Production of Biodegradable Container>

The thus-obtained biodegradable label for in-mold forming was set on a label magazine of a blow molding machine (Model: V-50, manufactured by Placo Co., Ltd.), fed by an automatic label feeder (manufactured by Pentel Co., Ltd.) to one mold of a split mold having a 800 ml-volume bottle-type cavity (diameter: 80 mm, length: 200 mm), and fixed to the cavity surface by applying a vacuum. A parison (diameter: 40 mm, thickness: 4 mm) of the aliphatic polyester (Al), melted at a cylinder temperature of 120° C., was extruded into the opened split mold, and after closing the split mold, a compressed air of 4.2 kg/cm$^2$G was fed into the parison to inflate the parison, whereby a container was shaped, and at the same time, the label was attached. The product container was then cooled, and the mold was opened. In this way, a biodegradable hollow container, as a product, was obtained. The obtained biodegradable hollow container was free of discoloration, on the printing surface of label, shrinkage, separation, and blistering of the label.

<Soil Burial Test>

The obtained biodegradable hollow container, as a product, was subjected to a soil burial test, according to the method described above. After the passing of test period, the outer appearance of the biodegradable hollow container was observed visually, and as a result, wormholes were present in the label attached portion, as well as on the container wall surface not attached with the label, revealing that biodegradation was proceeding.

Example 2

<Preparation of Laminate Film>

A composition (F1), consisting of 82 wt % of an aliphatic polyester resin (A2) (melting point: 112° C.), comprising 48.5 mol % of a constituent unit originated in 1,4-butanediol, 48.5 mol % of a constituent unit originated in succinic acid and 3.0 mol % of a constituent unit originated in lactic acid, and having a number average molecular weight of 62,000, and 18 wt % of a heavy calcium carbonate, having an average particle size of 1.5 μm, was prepared. Also, a composition (F2), consisting of 65 wt % of the aliphatic polyester resin (A2) and 35 wt % of a heavy calcium carbonate, having an average particle size of 1.5 μm, was prepared. The composition (F1), composition (F2) and aliphatic polyester resin (B) (melting point: 95° C.) (see, Example 1) were each melted in an extruder (used in Example 1), fed to one co-extrusion die set at a temperature of 140° C., then stacked in the die and extruded into a film form, from this co-extrusion die, and the resulting film was passed through a pair of embossing rolls, comprising a metal roll and a rubber roll, to form fine dotted embosses having a trough depth of 10 μm on the surface of the aliphatic polyester resin (B)-made film (b). In this way, a laminate film comprising four layers of (f2)/(f1)/(f2)/(b) was obtained. Here, (f1) and (f2) mean layers formed of the compositions (F1) and (F2), respectively.

This laminate film was re-heated to 90° C., and then stretched to 2.5 times in the longitudinal direction. Subsequently, the surface side of the (F2)-made layer (f2) was subjected to a corona discharge treatment in the same manner as in Example 1, and after cooling, the selvage was slit. The resulting four-layer laminate film had a width of 600 mm and the thickness of (f2)/(f1)/(f2)/(b) layers was 22 μm/66 μm/22 μm/10 μm. The opacity of this laminate film was 85%.

<Preparation of Biodegradable Label for In-Mold Forming>

The surface side of the (F2)-made layer (f2) of the four-layer laminate film, obtained above, was subjected to a corona discharge treatment in the same manner as in Example 1, and on the surface of the (F2)-made layer (f2), letters, or the like, were printed by offset printing in the same manner as in Example 1. Subsequently, the laminate film was punched to obtain a biodegradable label for in-mold forming, in a width of 70 mm and a length of 90 mm.

<Production of Biodegradable Container and Soil Burial Test>

A biodegradable hollow container was produced in the same manner as in Example 1, by using the biodegradable label for in-mold forming obtained above. This biodegradable hollow container was free of discoloration, on the printing surface of label, shrinkage, separation, and blistering of the separated portion. The obtained biodegradable hollow container, as a product, was subjected to a soil burial test, according to the method described above, and as a result, wormholes were present in the label attached portion, as well as on the container wall surface not attached with the label, revealing that biodegradation was proceeding.

Example 3

<Preparation of Film>

A composition (F3) having blended therein 70 wt % of the aliphatic polyester resin (A2) (see, Example 2), 12 wt % of a polylactic acid resin (A3) and 18 wt % of a heavy calcium carbonate, having an average particle size of 1.5 μm, was prepared. This composition (F3) was kneaded in an extruder set at a cylinder temperature of 180° C., then extruded into a sheet form, from a T-die fixed to the end of the extruder, and cooled with a cooling roll to obtain an unstretched sheet having a thickness of 600 μm. This unstretched sheet was heated to 90° C., and then stretched to 2 times in the longitudinal direction to obtain a stretched film (f3) having a thickness of 140 μm.

<Preparation of Laminate Film>

Separately, a composition (F4), comprising 65 wt % of the aliphatic polyester resin (A2) (see, Example 2) and 35 wt % of a heavy calcium carbonate, having an average particle size of 1.5 μm, and the aliphatic polyester resin (B) (melting point: 95° C.) (see, Example 1) were respectively melt-kneaded at 140° C. in separate extruders (used in Example 1), fed to one co-extrusion die, stacked in the die, and extruded into a film form, from this co-extrusion die, and the resulting film was passed through a pair of embossing rolls, comprising a metal roll and a rubber roll, to form fine dotted embosses, having a trough depth of 10 μm on the surface of the aliphatic polyester resin (B) layer. The film (f4) comprising the composition (F4), was stacked on the surface of the stretched film (f3) to obtain a laminate film.

This film having a laminate structure was re-heated to 90° C., and then stretched to 2 times in the cross direction. Subsequently, the surface of the composition (F3)-made film was subjected to a corona discharge treatment in the same manner as in Example 1, and after cooling, the selvage was slit. The resulting four-layer laminate film had a width of 600 mm and the thickness of (f4)/(f3)/(f4)/(b) layers was 20 μm/70 μm/20 μm/10 μm. The opacity of this laminate film was 94%.

<Preparation of Label>

The surface side of the (F3)-made film of the four-layer multilayer film, obtained above, was subjected to a corona discharge treatment in the same manner as in Example 1, and on the surface of the (F4)-made film (f4), letters, or the like, were printed by offset printing in the same manner as in Example 1. Subsequently, the laminate film was punched to obtain a biodegradable label for in-mold forming, in a width of 70 mm and a length of 90 mm.

<Production of Biodegradable Container and Soil Burial Test>

A biodegradable hollow container was produced in the same manner as in Example 1, by using the biodegradable label for in-mold forming obtained above. This biodegradable hollow container was free of discoloration on the printing surface of label, shrinkage, separation, and blistering of the separated portion. The obtained biodegradable hollow container, as a product, was subjected to a soil burial test according to the method described above, and as a result, wormholes were present in the label attached portion, as well as on the container wall surface not attached with the label, revealing that biodegradation was proceeding.

Example 4

<Preparation of Laminate Film>

The same polylactic acid resin (A2) (melting point: 173° C.), as used in Example 1, was melted in an extruder set at a cylinder temperature of 190° C., and then extruded into a sheet form, from the T-die, and the resulting sheet was cooled with a cooling roll to obtain a sheet (a2) having a thickness of 90 μm. Subsequently, the aliphatic polyester resin (B) (melting point: 95° C.) (see, Example 1) was melt-kneaded at 180° C., and extruded on the back side of the sheet (a2) to stack a heat-sealable film (b), and the resulting sheet was passed through a pair of embossing rolls, comprising a metal roll and a rubber roll, to form fine dotted embosses, having a trough depth of 5 μm on the surface of the heat-sealable film (b). This laminate film was a two-layer film, where the thickness of (a2)/(b) was 90 μm/10 μm. The opacity was 10%.

<Preparation of Label>

The surface of the sheet (a2) of the two-layer film obtained above, was subjected to a corona discharge treatment, and after cooling, the selvage was slit. On the surface of the sheet (a2), letters, or the like, were printed by offset printing in the same manner as in Example 1, and then the film was punched to obtain a biodegradable label for in-mold forming, in a width of 70 mm and a length of 90 mm.

<Production of Biodegradable Container and Soil Burial Test>

A biodegradable hollow container was produced in the same manner as in Example 1, by using the biodegradable label for in-mold forming obtained above. This biodegradable hollow container was free of discoloration, on the printing surface of label, shrinkage, separation, and blistering of the separated portion. The obtained biodegradable hollow container was subjected to a soil burial test, according to the method described above, and as a result, wormholes were present in the label attached portion, as well as on the container wall surface not attached with the label, revealing that biodegradation was proceeding.

While the present invention has been described in detail, and with reference to specific embodiments thereof, it will be apparent to one skilled in the art, that various changes and modifications can be made therein, without departing from the spirit and scope thereof.

This application is based on Japanese Patent Application No. 2002-133896, filed May 9, 2002, the entire contents of which are incorporated herein by reference.

INDUSTRIAL APPLICABILITY

As described in detail in the foregoing pages, the present invention gives the following specific excellent effects, and its utility value in industry is very high.

1. The biodegradable label for in-mold forming, according to the first invention of the present invention, is excellent in the water resistance, unlike conventional paper-made labels.

2. The biodegradable label for in-mold forming, according to the first invention of the present invention, allows for freely printing letters, or the like, by various printing methods, such as offset printing.

3. The biodegradable label for in-mold forming, according to the first invention of the present invention, is constituted by a biodegradable resin, and therefore, undergoes decomposition in a natural environment, so that the environmental pollution can be prevented.

4. The biodegradable label for in-mold forming, according to the first invention of the present invention, can realize strong heat adhesion between the label and the container wall surface, when comprising a laminate film of a film (a1), comprising a biodegradable resin (A), and of a film (b1), comprising a heat-sealable biodegradable resin (B), and setting the melting point of the biodegradable resin (B), 5° C., or more, lower than that of the biodegradable resin (A).

5. The biodegradable container, according to the second invention of the present invention, comprises a label and a container body, each constituted by a biodegradable resin, and therefore, undergoes decomposition in a natural environment, so that the environmental pollution can be prevented.

The invention claimed is:

1. A biodegradable container comprising a label for in-mold forming to a surface of the container, and wherein the container comprises a biodegradable resin (C), and the label for in-mold forming, comprises a laminate film (a/b), comprising a film (a), which comprises at least one biodegradable resin (A), and a film (b), which comprises at least one heat-sealable biodegradable resin (B), wherein at least one of the biodegradable resin (A) and at least one of the biodegradable resin (B) each comprises at least one member selected from the group consisting of an aliphatic polyester and a polylactic acid, and wherein each of the aliphatic polyester and the polylactic acid contains from 0.02 to 30 mol % of an aliphatic oxycarboxylic acid unit represented by the following formula [I], from 35 to 49.99 mol % of an aliphatic diol unit represented by the following formula [II], and from 35 to 49.99 mol % of an aliphatic dicarboxylic acid unit represented by the following formula [III]:

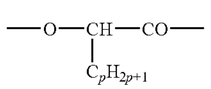
[I]

(wherein p is 0 or an integer of 1 to 10);

$$-O-(CH_2)_m-O- \quad [II]$$

(wherein m is an integer of 2 to 10); and $$-OC-(CH_2)_n-CO- \quad [III]$$

(wherein n is 0 or an integer of 1 to 12), wherein the melting point of the biodegradable resin contained in the largest amount in heat-sealable biodegradable resin (B) is 5° C. or more lower than the melting point of the biodegradable resin contained in the largest amount in biodegradable resin (A), wherein the melting point of biodegradable resin (B) is from 60 to 180° C., and wherein the label is heat bonded to the container via film (b).

2. The container as claimed in claim 1, wherein the film (a) is a laminate film comprising at least a uniaxially stretched layer.

3. The container as claimed in claim 1, wherein the melting point of biodegradable resin (B) is from 80 to 120° C.

4. The container as claimed in claim 1, wherein the film (a) comprises a biodegradable resin (A) and at least an inorganic fine powder (E1), an organic filler (E2), or combinations thereof.

5. The container as claimed in claim 4, wherein the film (a) is a laminate film comprising at least a uniaxially stretched layer.

6. A label comprising (1) a laminate film comprising a film (a), which comprises at least one biodegradable resin (A), and a film (b), which comprises at least one heat-sealable biodegradable resin (B), and (2) one or more additives, wherein at least one of the biodegradable resin (A) and at least one of the biodegradable resin (B) each comprises at least one member selected from the group consisting of an aliphatic polyester and a polylactic acid, and wherein each of the aliphatic polyester and the polylactic acid contains from 0.02 to 30 mol % of an aliphatic oxycarboxylic acid unit represented by the following formula [I], from 35 to 49.99 mol % of an aliphatic diol unit represented by the following formula [II], and from 35 to 49.99 mol % of an aliphatic dicarboxylic acid unit represented by the following formula [III];

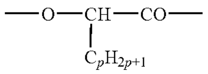

[I]

(wherein p is 0 or an integer of 1 to 10);

$$-O-(CH_2)_m-O- \quad [II]$$

(wherein m is an integer of 2 to 10); and $$-OC-(CH_2)_n-CO- \quad [III]$$

(wherein n is 0 or an integer of 1 to 12), wherein the melting point of the biodegradable resin contained in the largest amount in heat-sealable biodegradable resin (B) is 5° C. more lower than the melting point of the biodegradable resin contained in the largest amount in biodegradable resin (A), and wherein the melting point of biodegradable resin (B) is from 60 to 180° C.

7. The label of claim 6, wherein the label is biodegradable.

8. The label of claim 6, wherein the melting point of biodegradable resin (B) is from 80 to 120° C.

* * * * *